US008716635B2

(12) United States Patent
Noguchi et al.

(10) Patent No.: US 8,716,635 B2
(45) Date of Patent: *May 6, 2014

(54) HONEYCOMB STRUCTURE (75) Inventors: Yasushi Noguchi, Nagoya (JP); Atsushi Kaneda, Ichinomiya (JP); Mariko Kakitani, Kouza-Gun (JP); Yoshimasa Omiya, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/440,148

(22) Filed: Apr. 5, 2012

(65) Prior Publication Data
US 2012/0187109 A1 Jul. 26, 2012

Related U.S. Application Data (63) Continuation of application No. PCT/JP2010/067678, filed on Oct. 7, 2010.

(30) Foreign Application Priority Data

Oct. 7, 2009 (JP) .................................. 2009-233092

(51) Int. Cl.
*H05B 3/10* (2006.01)
*B32B 3/12* (2006.01)

(52) U.S. Cl.
USPC ............ 219/553; 428/116; 428/118; 422/174

(58) Field of Classification Search
USPC .................... 219/553; 428/116, 118; 422/174
See application file for complete search history.

(56) References Cited

U.S. PATENT DOCUMENTS

| 5,063,029 A | 11/1991 | Mizuno et al. |
| 5,200,154 A | 4/1993 | Harada et al. |
| 5,266,278 A | 11/1993 | Harada et al. |
| 5,288,975 A | 2/1994 | Kondo |
| RE35,134 E | 12/1995 | Mizuno et al. |
| 2003/0134084 A1 | 7/2003 | Ichikawa et al. |
| 2005/0050845 A1 | 3/2005 | Masukawa et al. |
| 2008/0229931 A1 | 9/2008 | Katsuyama et al. |

(Continued)

FOREIGN PATENT DOCUMENTS

| CN | 101321934 A | 12/2008 |
| EP | 2 234 462 A2 | 9/2010 |

(Continued)

OTHER PUBLICATIONS

U.S. Appl. No. 13/591,494, filed Aug. 22, 2012, Noguchi et al.

(Continued)

*Primary Examiner* — Shawntina Fuqua
(74) *Attorney, Agent, or Firm* — Burr & Brown, PLLC (57) ABSTRACT A honeycomb structure includes: a honeycomb structural portion having porous partition walls functioning as fluid passages and separating and forming a plurality of cells extending from one end face to the other end face. The partition walls and the outer peripheral wall contain silicon carbide particles as a framework and silicon as a binder for binding the silicon carbide particles. The honeycomb structure has a partition walls thickness of 50 to 200 μm, a cell density of 40 to 150 cells/cm$^2$, and an average particle diameter of the silicon carbide as a framework of 3 to 40 μm. The honeycomb structural portion has a volume resistivity of 1 to 40 Ωcm at 400° C., and the volume resistivity of the electrode portion at 400° C. is not more than 40% of the volume resistivity of the honeycomb structural portion at 400° C.

14 Claims, 4 Drawing Sheets

(56) References Cited

U.S. PATENT DOCUMENTS

| | | |
|---|---|---|
| 2009/0200712 A1 | 8/2009 | Hayashi et al. |
| 2009/0313846 A1 | 12/2009 | Horiba et al. |
| 2010/0135866 A1 | 6/2010 | Mizuno et al. |

FOREIGN PATENT DOCUMENTS

| | | |
|---|---|---|
| EP | 2 374 773 A1 | 10/2011 |
| JP | 04-067588 A1 | 3/1992 |
| JP | 2931362 B2 | 8/1999 |
| JP | 2000-103677 A1 | 4/2000 |
| JP | 2004-130176 A1 | 4/2004 |
| JP | 4136319 B2 | 8/2008 |
| WO | 2008/053647 A1 | 5/2008 |
| WO | 2008/117625 A1 | 10/2008 |
| WO | 2008/136232 A1 | 11/2008 |

OTHER PUBLICATIONS

U.S. Appl. No. 13/628,521, filed Sep. 27, 2012, Sakashita et al.
U.S. Appl. No. 13/628,672, filed Sep. 27, 2012, Sakashita et al.
U.S. Appl. No. 13/628,740, filed Sep. 27, 2012, Sakashita et al.
International Search Report and Written Opinion dated Dec. 28, 2010.
U.S. Appl. No. 13/432,322, filed Mar. 28, 2012, Noguchi et al.
Chinese Office Action dated Jun. 3, 2013.
Extended European Search Report (Application No. 10822104.5) dated Feb. 17, 2014.

HONEYCOMB STRUCTURE

BACKGROUND OF THE INVENTION

1. Field of the Invention

The present invention relates to a honeycomb structure, more preferably to a honeycomb structure having a volume resistivity within a predetermined range and electrode portions capable of being formed easily and further functioning as a heater, while serving as a catalyst carrier.

2. Description of Related Art

There has conventionally been used a cordierite honeycomb structure where a catalyst is loaded for treating harmful substances in exhaust gas discharged from an automobile engine. It is also known that a honeycomb structure formed of a silicon carbide based sintered body is used for purifying exhaust gas (see, e.g., Patent Document 1).

In the case of treating exhaust gas by a catalyst loaded on a honeycomb structure, it is necessary to raise the temperature of the catalyst up to a predetermined level. However, there is a problem of insufficient purification of exhaust gas at the time of engine starting because the temperature of the catalyst is low.

Therefore, there is investigated a method where the temperature of exhaust gas is raised with a metal heater disposed on the upstream side of a honeycomb structure having a catalyst loaded thereon (see, e.g., Patent Document 2).

PRIOR ART DOCUMENT

Patent Document

Patent Document 1: U.S. Pat. No. 4,136,319 bulletin
Patent Document 2: U.S. Pat. No. 2,931,362 bulletin In the case of using a heater as described above by mounting it on an automobile, a power source used in an electrical system of the automobile is used in common, and a power source having a high voltage of, for example, 200V is used. However, since a metal heater has a low electrical resistance, in the case of using a power source having a high voltage of 200V, there arises a problem of damaging the power source circuit due to an excessive flow of a current.

In addition, in the case of a metal heater, since loading of a catalyst is difficult even on a heater processed into a honeycomb structure, it is difficult to unitarily load the catalyst on the heater.

SUMMARY OF THE INVENTION

The present invention has been made in view of the aforementioned problems and aims at providing a honeycomb structure having a volume resistivity within a predetermined range and electrode portions capable of being formed easily and further functioning as a heater, while serving as a catalyst carrier.

In order to solve the aforementioned problems, the present invention provides the following honeycomb structure.

According to a first aspect of the present invention, a honeycomb structure is provided, comprising a cylindrical honeycomb structural portion having porous partition walls functioning as fluid passages and separating and forming a plurality of cells extending from one end face to the other end face and an outer peripheral wall located at the outermost periphery, and a pair of electrode portions disposed on the side face of the honeycomb structural portion, wherein the partition walls and the outer peripheral wall contain silicon carbide particles as a framework and silicon as a binder for binding the silicon carbide particles, the honeycomb structure has a partition wall thickness of 50 to 200 µm, a cell density of 40 to 150 cells/cm$^2$, and an average particle diameter of the silicon carbide particles as a framework of 3 to 40 µm, and the honeycomb structural portion has a volume resistivity of 1 to 40 Ωcm at 400° C., and the volume resistivity of the electrode portion at 400° C. is not more than 40% of the volume resistivity of the honeycomb structural portion at 400° C.

According to a second aspect, the honeycomb structure according to the first aspect is provided, wherein each of the pair of electrode portions is formed into a band shape extending in a cell extension direction of the honeycomb structural portion, and, in a cross section perpendicular to the cell extension direction, one of the pair of electrode portions is disposed across a central portion of the honeycomb structural portion from the other electrode portion.

According to a third aspect, the honeycomb structure according to the first or second aspects is provided, wherein the length of the electrode portion in the cell extension direction is not more than 90% of the length of the honeycomb structure in the cell extension direction.

According to a fourth aspect, the honeycomb structure according to any one of the first to third aspects is provided, wherein the length of the electrode portions in the peripheral direction of the honeycomb structural portion is $\frac{1}{30}$ to $\frac{1}{3}$ of the length of the side face of the honeycomb structural portion in the peripheral direction.

According to a fifth aspect, the honeycomb structure according to any one of the first to fourth aspects is provided, wherein the electrode portions have a thickness of 0.2 to 6.0 mm.

According to a sixth aspect, the honeycomb structure according to any one of the first to fifth aspects is provided, wherein an electrode terminal protrusion for connecting an electric wire thereto is disposed on each of the pair of electrode portions, and the volume resistivity of the electrode terminal protrusion at 400° C. is not more than 40% of the volume resistivity of the honeycomb structural portion at 400° C.

According to a seventh aspect, the honeycomb structure according to the sixth aspect is provided, wherein the electrical resistance measured at 400° C. between the electrode terminal protrusions disposed on each of the pair of electrode portions is 1 to 30Ω.

According to an eighth aspect, the honeycomb structure according to any one of the first to seventh aspects is provided, wherein the electrode portions contain silicon carbide particles and silicon as the main components.

According to a ninth aspect, the honeycomb structure according to the eighth aspect is provided, wherein the electrode portions have a porosity of 30 to 60% and an average pore size of 5 to 45 µm, the ratio of mass of the silicon to total mass of the silicon carbide particles and the silicon contained in the electrode portions is 20 to 50 mass %, the average particle diameter of the silicon carbide particles contained in the electrode portions is 10 to 70 µm, and the volume resistivity of the electrode portions at 400° C. is 0.1 to 10 Ωcm.

According to a tenth aspect, the honeycomb structure according to any one of the sixth to ninth aspects is provided, wherein the electrode terminal protrusions contain silicon carbide particles and silicon as the main components.

According to an eleventh aspect, the honeycomb structure according to the tenth aspect is provided, wherein the electrode terminal protrusions have a porosity of 25 to 45% and an average pore size of 5 to 30 µm, the ratio of mass of the silicon to the total mass of the silicon carbide particles and the silicon contained in the electrode terminal protrusions is 20 to 50 mass %, the average particle diameter of the silicon carbide particles contained in the electrode terminal protrusions is 10 to 70 μm, and the volume resistivity of the electrode terminal protrusions at 400° C. is 0.1 to 10 Ωm.

According to a twelfth aspect, the honeycomb structure according to any one of the first to eleventh aspects is provided, wherein the honeycomb structure has a partition walls thickness of 70 to 130 μm and a cell density of 70 to 100 cells/cm$^2$, and the silicon carbide particles as the framework have an average particle diameter of 10 to 35 μm, the partition walls have a porosity of 35 to 45%, and an average pore size of 10 to 20 μm, the ratio of mass of the silicon as the binder to the total mass of the silicon carbide particles as the framework and the silicon as the binder contained in the honeycomb structural portions is 25 to 35 mass %, and the volume resistivity of the honeycomb structural portion at 400° C. is 10 to 35 Ωcm.

According to a thirteenth aspect, the honeycomb structure according to any one of the first to twelfth aspects is provided, wherein the cell shape in a cross section perpendicular to the cell extension direction is quadrangular or hexagonal.

According to a fourteenth aspect, the honeycomb structure according to any one of first to thirteenth aspects is provided, wherein, in a cross section perpendicular to the cell extension direction, when a tangent line in contact with the outer periphery of the honeycomb structural portion is drawn in the central portion of the honeycomb structural portion in the peripheral direction, the tangent line is parallel to a partition wall.

In the honeycomb structure of the present invention, since the honeycomb structural portion has a volume resistivity of 1 to 40 Ωcm at 400° C., even if a current is sent by the use of a power source having a high voltage, the current does not flow excessively, and therefore the honeycomb structure can suitably be used as a heater. In addition, since the partition wall thickness is 50 to 200 μm, even if a catalyst is loaded on the honeycomb structure used as a catalyst carrier, too much increase in pressure loss upon sending exhaust gas thereinto can be inhibited.

DETAILED DESCRIPTION OF THE INVENTION

Next, embodiments for carrying out the present invention will be described in detail with referring to drawings. However, the present invention is by no means limited to the following embodiments, and it should be understood that changes, improvements, and the like, of the design may suitably be made on the basis of ordinary knowledge of a person of ordinary skill in the art within the range of not deviating from the gist of the present invention.

Figure 1:
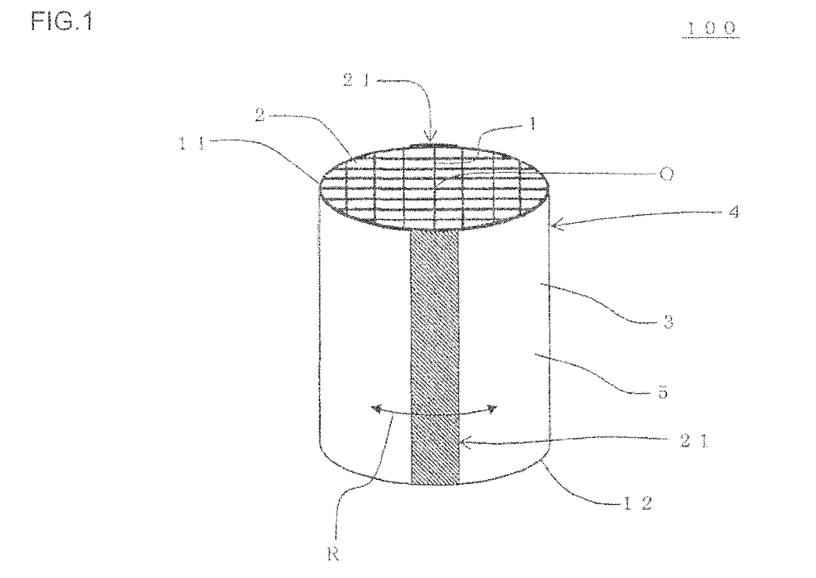
FIG. 1 is a perspective view schematically showing an embodiment of a honeycomb structure of the present invention.
Figure 2:
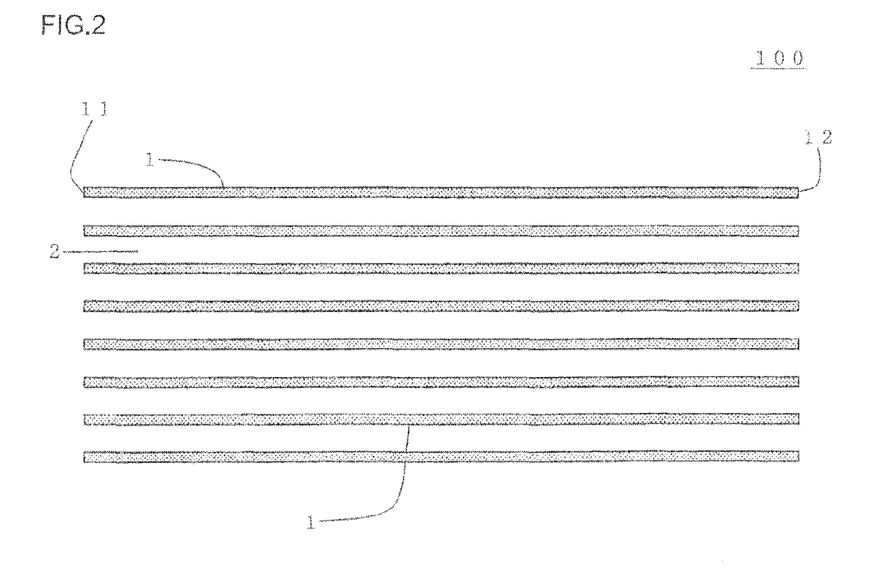
FIG. 2 is a schematic view showing a cross section parallel to the cell extension direction of an embodiment of a honeycomb structure of the present invention.

(1) Honeycomb Structure:

As shown in FIGS. 1 and 2, an embodiment of a honeycomb structure of the present invention is provided with a cylindrical honeycomb structural portion 4 having porous partition walls 1 functioning as fluid passages and separating and forming a plurality of cells 2 extending from one end face 11 to the other end face 12 and an outer peripheral wall 3 located at the outermost periphery (disposed so as to surround the outer periphery of the entire partition walls 1), and a pair of electrode portions 21, 21 disposed on the side face of the honeycomb structural portion 4. The partition walls 1 and the outer peripheral wall 3 contain silicon carbide particles (silicon carbide) as a framework and silicon as a binder for binding the silicon carbide particles. The honeycomb structure has a partition wall 1 thickness of 50 to 200 μm, a cell density of 40 to 150 cells/cm$^2$, and an average particle diameter of the silicon carbide particles as a framework of 3 to 40 μm. The honeycomb structural portion 4 has a volume resistivity of 1 to 40 Ωcm at 400° C., and the volume resistivity of the electrode portion 21 at 400° C. is not more than 40% of the volume resistivity of the honeycomb structural portion 4 at 400° C. FIG. 1 is a perspective view schematically showing an embodiment of a honeycomb structure of the present invention. FIG. 2 is a schematic view showing a cross section parallel to the cell extension direction of an embodiment of a honeycomb structure of the present invention. Incidentally, no electrode portion is shown in FIG. 2.

Thus, in the honeycomb structure 100 of the present invention, since the honeycomb structural portion 4 has a volume resistivity of 1 to 40 Ωcm at 400° C., even if a current is allowed to flow by the use of a power source having a high voltage, a current does not flow excessively, and therefore the honeycomb structure can suitably be used as a heater. In addition, since the partition wall thickness is 50 to 200 μm, even if the honeycomb structure is used as a catalyst carrier with loading a catalyst thereon, too much increase in pressure loss upon sending exhaust gas thereinto can be inhibited.

In the honeycomb structure 100 of the present embodiment, the partition walls 1 and the outer peripheral wall 3 contain silicon carbide particles as the framework and silicon as the binder for binding the silicon carbide particles. In the honeycomb structure 100 of the present embodiment, a plurality of silicon carbide particles are bound by silicon so as to form pores among the silicon carbide particles.

In the honeycomb structure 100 of the present embodiment, a pair of electrode portions 21, 21 are disposed on the side face of the honeycomb structural portion 4. The honeycomb structure 100 of the present embodiment generates heat by applying a voltage between the pair of electrode portions 21, 21. The voltage to be applied is preferably 50 to 300V, more preferably 100 to 200V. For example, in the case of using a power source having a voltage of 200V in the electrical system of an automobile, it is preferable to apply a voltage of 200V.

In the honeycomb structure 100 of the present embodiment, the partition wall thickness is 50 to 200 μm, more preferably 70 to 130 μm. By such a range of the partition wall thickness, even if a catalyst is loaded on the honeycomb structure 100 used as the catalyst carrier, too much increase in pressure loss upon sending exhaust gas thereinto can be inhibited. A partition wall thickness of smaller than 50 μm is not preferable because the pressure loss upon sending exhaust gas thereinto becomes too large in the case that a catalyst is loaded on the honeycomb structure 100 used as the catalyst carrier.

The honeycomb structure 100 of the present embodiment has a cell density of 40 to 150 cells/cm$^2$, more preferably 70 to 100 cells/cm$^2$. By such a range of the cell density to such a range, the purification performance of the catalyst can be enhanced in a state where the pressure loss upon sending exhaust gas thereinto is kept small. A cell density of lower than 40 cells/cm$^2$ is not preferable because the catalyst loading area becomes small. A cell density of higher than 150 cells/cm$^2$ is not preferable because the pressure loss upon sending exhaust gas thereinto becomes large in the case that a catalyst is loaded on the honeycomb structure 100 used as the catalyst carrier.

In the honeycomb structure 100 of the present embodiment, the average particle diameter of the silicon carbide particles (framework) constituting the honeycomb structural portion 4 is 3 to 40 μm, preferably 10 to 35 μm. Such a range of the average particle diameter of the silicon carbide particles constituting the honeycomb structural portion 4 enables the volume resistivity of the honeycomb structure 100 at 400° C. to be 1 to 40 Ωcm. The case that the average particle diameter of the silicon carbide particles is smaller than 3 μm is not preferable because the volume resistivity of the honeycomb structure 100 at 400° C. becomes high. The case that the average particle diameter of the silicon carbide particles is larger than 40 μm is not preferable because the volume resistivity of the honeycomb structure 100 at 400° C. becomes low. In addition, the case that the average particle diameter of the silicon carbide particles is larger than 40 μm is not preferable because a die for extrusion may be clogged with a forming raw material upon extrusion of the honeycomb formed body. The average particle diameter of the silicon carbide particles is measured by a laser diffraction method.

In the honeycomb structure 100 of the present embodiment, the volume resistivity of the honeycomb structural portion 4 at 400° C. is 1 to 40 Ωcm, preferably 10 to 35 Ωcm. The case that the volume resistivity at 400° C. is lower than 1 Ωcm is not preferable because a current flows excessively upon electrifying the honeycomb structure 100 by a power source of 200V (the voltage is not limited to 200V). The case that the volume resistivity at 400° C. is higher than 40 Ωcm is not preferable because the flow of the current becomes hard, which makes the heat generation insufficient upon electrifying the honeycomb structure 100 by a power source of 200V (the voltage is not limited to 200V). The volume resistivity of the honeycomb structure at 400° C. is measured by a two terminal method.

In the honeycomb structure 100 of the present embodiment, the electrical resistance of the honeycomb structure 100 at 400° C. is preferably 1 to 30Ω, more preferably 10 to 25Ω. The case that the electrical resistance at 400° C. is smaller than 1Ω is not preferable because a current flows excessively when the honeycomb structure 100 is electrified by a power source of, for example, 200V (the voltage is not limited to 200V). The case that the electrical resistance at 400° C. is larger than 30Ω is not preferable because the flow of the current becomes hard when the honeycomb structure 100 is electrified by a power source of, for example, 200V (the voltage is not limited to 200V). The electrical resistance of the honeycomb structure at 400° C. is measured by a two terminal method.

In the honeycomb structure 100 of the present embodiment, the volume resistivity of the electrode portions 21 at 400° C. is lower than the volume resistivity of the honeycomb structural portion 4 at 400° C. Further, the volume resistivity of the electrode portions 21 at 400° C. is not more than 40%, preferably 0.1 to 30%, of the volume resistivity of the honeycomb structural portion 4 at 400° C. By allowing the volume resistivity of the electrode portions 21 at 400° C. to be not more than 40% of the volume resistivity of the honeycomb structural portion 4 at 400° C., the electrode portions 21 function more effectively as electrodes.

In the honeycomb structure 100 of the present embodiment, the ratio of the "mass of the silicon as the binder" to the total of the "mass of the silicon carbide particles as the framework" contained in the honeycomb structural portion 4 and the "mass of the silicon as the binder" contained in the honeycomb structural portion 4 is preferably 10 to 40 mass %, more preferably 15 to 35 mass %, particularly preferably 25 to 35 mass %. When it is lower than 10 mass %, the strength of the honeycomb structure may fall. When it is higher than 40 mass %, it may be impossible to maintain the shape upon firing.

The porosity of the partition walls 1 is preferably 30 to 60%, more preferably 35 to 45%. A porosity of below 30% is not preferable because deformation upon firing becomes large. A porosity of above 60% is not preferable because the strength of the honeycomb structure falls. The porosity is measured by a mercury porosimeter.

The average pore size of the partition walls 1 is preferably 2 to 20 μm, more preferable 10 to 20 μm. An average pore size of smaller than 2 μm is not preferable because the volume resistivity becomes too high. An average pore size of larger than 20 μm is not preferable because the volume resistivity becomes too low. The average pore size is measured by a mercury porosimeter.

In the honeycomb structure 100 of the present embodiment, it is preferable that the partition wall 1 thickness is 70 to 130 μm, that the cell density is 70 to 100 cells/cm$^2$, the average particle diameter of silicon carbide particles as the framework is 10 to 35 μm, that the porosity of the partition walls 1 is 35 to 45%, that the average pore size of the partition walls 1 is 10 to 20 μm, that the ratio of the mass of the silicon as the binder to the total of the mass of the silicon carbide particles as the framework and the mass of the silicon as the binder contained in the honeycomb structural portion 4 is 25 to 35 mass %, and that the honeycomb structural portion 4 has a volume resistivity of 10 to 35 Ωcm at 400° C. By such a configuration of the honeycomb structure 100 of the present embodiment, there is an advantage of excellent exhaust gas purification performance because of particularly low pressure loss when exhaust gas is sent thereinto.

In the honeycomb structure 100 of the present embodiment, it is preferable that the partition walls 1 and the outer peripheral wall 3 contain, as the main components, silicon carbide particles as the framework and silicon as the binder for binding the silicon carbide particles and may be formed only from silicon carbide and silicon. Even in the case that the partition walls 1 and the outer peripheral wall 3 are formed only from silicon carbide and silicon, a minute amount of not more than 10 mass % of impurities may be contained. In the case that the partition walls 1 and the outer peripheral wall 3 contain substances (a minute amount of impurities) other than "silicon carbide and silicon", examples of the impurities contained in the partition walls 1 and the outer peripheral wall 3 include silicon oxide and strontium. Here, "the partition walls 1 and the outer peripheral wall 3 contain silicon carbide and silicon as the main components" means that the partition walls 1 and the outer peripheral wall 3 contain silicon carbide and silicon at a rate of 90 mass % or more of the total.

As shown in FIG. 1, it is preferable that each of the pair of electrode portions 21, 21 is formed into a "band shape" extending in a cell 2 extension direction of the honeycomb structural portion 4. In addition, it is preferable that, in a cross section perpendicular to the cell 2 extension direction, one electrode 21 of the pair of electrode portions 21, 21 is disposed across a central portion O of the honeycomb structural portion 4 from the other electrode portion 21. Since the electrode portions 21 are formed into a band shape in such a manner that the longitudinal direction of each band-shaped electrode portion 21 extends in the cell 2 extension direction of the honeycomb structural portion 4, the entire honeycomb structural portion 4 can be heated more uniformly. In addition, since, in a cross section perpendicular to the cell 2 extension direction, one electrode 21 of the pair of electrode portions 21, 21 is disposed across a central portion O of the honeycomb structural portion 4 from the other electrode portion 21, the entire honeycomb structural portion 4 can be heated more uniformly.

Figure 6:
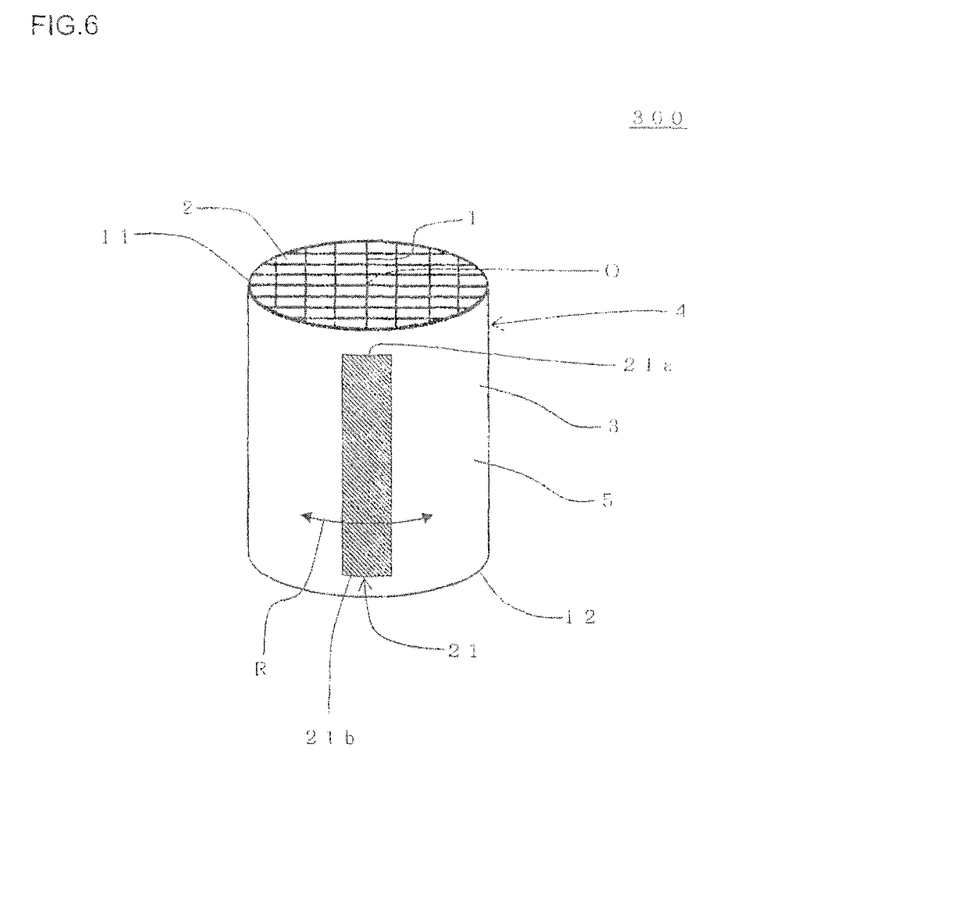
FIG. 6 is a perspective view schematically showing another embodiment of a honeycomb structure of the present invention.

As shown in FIG. 1, the electrode portions 21 may be disposed on the honeycomb structural portion 4 so as to extend between both the end portions (between both the end faces 11 and 12) of the honeycomb structural portion 4. However, as shown in FIG. 6, there may be a gap between each of the end portions 21a, 21b, in the "cell 2 extension direction", of each electrode portion 21 and each of the end portions (one end face 11 and the other end face 12) of the honeycomb structural portion 4. In the case that there is a gap between each of the end portions 21a, 21b, in the "cell 2 extension direction", of each electrode portion 21 and each of the end portions (one end face 11 and the other end face 12) of the honeycomb structural portion 4, the length of the electrode portions 21 in the "cell 2 extension direction" is preferably 50% or more, more preferably 80% or more, particularly preferably 90% or more of the length of the honeycomb structure in the "cell extension direction". FIG. 6 is a perspective view schematically showing another embodiment (honeycomb structure 300) of a honeycomb structure of the present invention.

The length (width) of the electrode portions 21 in the "peripheral direction R of the honeycomb structural portion 4" is preferably 1/30 to 1/3, more preferably 1/10 to 1/4, of the length of the side face 5 of the honeycomb structural portion 4 in the peripheral direction R. This range enables to heat the entire honeycomb structural portion 4 more uniformly. When the length (width) of the electrode portions 21 in the peripheral direction R of the honeycomb structural portion 4 is smaller than 1/30 of the length in the peripheral direction R of the side face 5 of the honeycomb structural portion 4, it may be impossible to generate heat uniformly. When it is larger than 1/3, it may become hard to heat the area around the central portion of the honeycomb structural portion 4.

The thickness of the electrode portions 21 is preferably 0.05 to 2.0 mm. Such a range enables uniform heat generation. When the thickness of the electrode portions 21 is smaller than 0.05 mm, uniform heat generation may become impossible due to high electrical resistance. When it is larger than 2.0 mm, breakage may be caused upon canning.

Figure 3A:
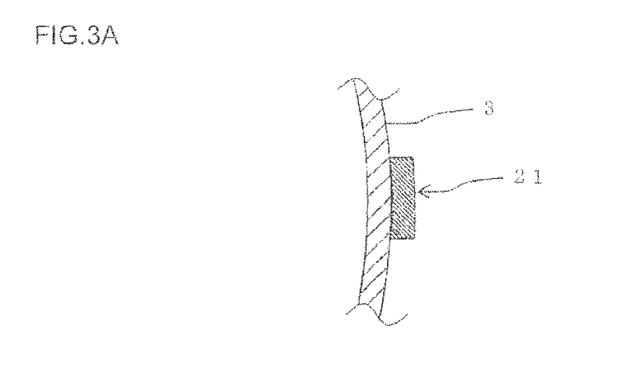
FIG. 3A is a schematic view showing a state where an electrode portion is disposed on the outer peripheral wall in a cross section perpendicular to the cell extension direction of an embodiment of a honeycomb structure of the present invention.
Figure 3B:
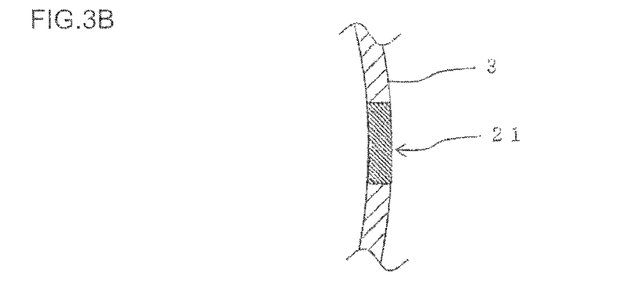
FIG. 3B is a schematic view showing a state where an electrode portion is disposed on the outer peripheral wall in a cross section perpendicular to the cell extension direction of another embodiment of a honeycomb structure of the present invention.
Figure 3C:
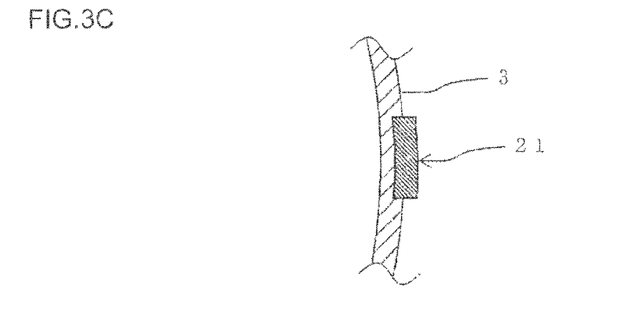
FIG. 3C is a schematic view showing a state where an electrode portion is disposed on the outer peripheral wall in a cross section perpendicular to the cell extension direction of still another embodiment of a honeycomb structure of the present invention.
Figure 3D:
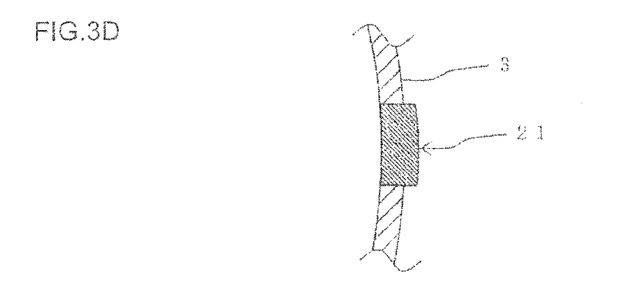
FIG. 3D is a schematic view showing a state where an electrode portion is disposed on the outer peripheral wall in a cross section perpendicular to the cell extension direction of still another embodiment of a honeycomb structure of the present invention.

As shown in FIG. 3A, the electrode portions 21 are preferably disposed on the surface of the outer peripheral wall 3. As shown in FIG. 3B, the electrode portions 21 may be disposed so as to be embedded in the outer peripheral wall 3. As shown in FIGS. 3C and 3D, it is also a preferable mode that a part (on the side in contact with the outer peripheral wall) of each of the electrode portions 21 is embedded in the outer peripheral wall 3, whereas the other portion (a part on the surface side) is exposed to the outside of the outer peripheral wall 3 (on the surface side). FIG. 3C shows a mode where the thickness of the portion embedded in the outer peripheral wall 3 of the electrode portion 21 is smaller than the thickness of the outer peripheral wall 3. FIG. 3D shows a mode where the thickness of the portion embedded in the outer peripheral wall 3 of the electrode portion 21 is the same as the thickness of the outer peripheral wall 3. FIG. 3A is a schematic view showing a state where an electrode portion 21 is disposed on the outer peripheral wall 3 in a cross section perpendicular to the cell extension direction of an embodiment of a honeycomb structure of the present invention. FIG. 3B is a schematic view showing a state where an electrode portion 21 is disposed on the outer peripheral wall 3 in a cross section perpendicular to the cell extension direction of another embodiment of a honeycomb structure of the present invention. FIG. 3C is a schematic view showing a state where an electrode portion 21 is disposed on the outer peripheral wall 3 in a cross section perpendicular to the cell extension direction of still another embodiment of a honeycomb structure of the present invention. FIG. 3D is a schematic view showing a state where an electrode portion 21 is disposed on the outer peripheral wall 3 in a cross section perpendicular to the cell extension direction of still another embodiment of a honeycomb structure of the present invention. In FIGS. 3A to 3D, only a part of the outer peripheral wall 3 and one electrode 21 are shown, and no partition wall or the like is shown.

It is preferable that the electrode portions 21 contain silicon carbide particles and silicon as the main components. Here, "silicon carbide particles and silicon as the main components" means that the total mass of silicon carbide particles and silicon is 90 mass % or more of the mass of the entire electrode portions. Since the electrode portions 21 thus contain silicon carbide particles and silicon as the main components, the components of the electrode portions 21 and the components of the honeycomb structural portion 4 are the same (or close), and therefore the thermal expansion coefficient of the electrode portions 21 and that of the honeycomb structural portion 4 become the same (or close). In addition, since the materials become the same (or close), the bonding strength between the electrode portions 21 and the honeycomb structural portion 4 is enhanced. Therefore, even if thermal stress is applied to the honeycomb structure, peeling of the electrode portion 21 from the honeycomb structural portion 4 and breakage of the bonded portion between the electrode portion 21 and the honeycomb structural portion 4 can be inhibited.

The volume resistivity of the electrode portions 21 at 400° C. is 0.1 to 10 Ωcm, more preferably 1 to 10 Ωcm. Such a range of the volume resistivity of the electrode portions 21 at 400° C. enables the pair of electrode portions 21, 21 to effectively function as an electrode in a pipe where high temperature exhaust gas flows. When the volume resistivity of the electrode portions 21 at 400° C. is smaller than 0.1 Ωcm, deformation may be caused upon production. When the volume resistivity of the electrode portions 21 at 400° C. is larger than 10 Ωcm, the flow of a current becomes hard, and thereby it may be difficult for the electrode portions to function as an electrode.

The porosity of the electrode portions 21 is preferably 30 to 60%, more preferably 45 to 55%. Such a range of the porosity of the electrode portions 21 enables to obtain suitable volume resistivity. When the porosity of the electrode portions 21 is lower than 30%, deformation may be caused upon production. When the porosity of the electrode portion 21 is higher than 60%, the volume resistivity may become too high. The porosity is measured by a mercury porosimeter.

The electrode portions 21 have an average pore size of preferably 5 to 45 µm, more preferably 20 to 40 µm. Such a range of the average pore size of the electrode portions 21 enables to obtain suitable volume resistivity. When the average pore size of the electrode portions 21 is smaller than 5 µm, the volume resistivity may become too high. When the average pore size of the electrode portions 21 is larger than 45 µm, strength is low, and breakage may be caused. The average pore size is measured by a mercury porosimeter.

In the case that the main components of the electrode portions 21 are silicon carbide particles and silicon, the average particle size of the silicon carbide particles contained in the electrode 21 is preferably 10 to 70 µm, more preferable 10 to 35 µm. Such a range of the average particle diameter of the silicon carbide particles contained in the electrode portions 21 enables the volume resistivity of the electrode portions 21 at 400° C. to be 0.1 to 10 Ωcm. When the average pore size of the silicon carbide particles contained in the electrode 21 is smaller than 10 µm, the volume resistivity of the electrode portions 21 at 400° C. may become too high. When the average pore size of the silicon carbide particles contained in the electrode portions 21 is larger than 70 µm, strength of the portions 21 is low, and breakage may be caused. The average particle diameter of the silicon carbide particles contained in the electrode portions 21 is measured by a laser diffraction method.

The ratio of mass of the silicon contained in the electrode portions 21 to the "total mass of the silicon carbide particles and the silicon" contained in the electrode portions 21 is preferably 20 to 50 mass %, more preferably 20 to 40 mass %. Such a range of the ratio of mass of the silicon to the total mass of the silicon carbide particles and the silicon contained in the electrode portions 21 enables to obtain suitable volume resistivity. When the ratio of mass of the silicon to the total mass of the silicon carbide particles and the silicon contained in the electrode portions 21 is smaller than 20 mass %, the volume resistivity may become too high. When it is larger than 50 mass %, deformation may be caused upon production.

In the honeycomb structure 100 of the present embodiment, it is preferable that the electrode portions 21 have a porosity of 30 to 60% and an average pore size of 5 to 45 µm, that the ratio of the "mass of the silicon" contained in the electrode portions 21 to the "total mass of the silicon carbide particles and the silicon" contained in the electrode portions 21 is 20 to 50 mass %, that the average particle diameter of the silicon carbide particles contained in the electrode portions 21 is 10 to 70 µm, and that the volume resistivity of the electrode portions 21 is 0.1 to 10 Ωcm. This enables to generate heat in the honeycomb structure uniformly upon electrification.

When a honeycomb structure of the present embodiment, it is preferable that, in a cross section perpendicular to the cell extension direction, when a tangent line in contact with the outer periphery of the honeycomb structural portion is drawn in the central portion in the peripheral direction of the honeycomb structural portion, the tangent line is parallel to a partition wall. This enables to inhibit breakage upon canning.

In addition, the thickness of the outer peripheral wall 3 constituting the outermost peripheral wall of the honeycomb structure 100 of the present invention is preferably 0.1 to 2 mm. When it is smaller than 0.1 mm, strength of the honeycomb structure 100 may fall. When it is larger than 2 mm, the area of the partition walls where a catalyst is loaded may be small.

In the honeycomb structure 100 of the present embodiment, the shape of the cells 2 in a cross section perpendicular to the cell 2 extension direction is preferably quadrangular or hexagonal. By allowing the shape to have such a shape, pressure loss upon sending exhaust gas into the honeycomb structure 100 becomes small to make purification performance of the catalyst excellent.

There is no particular limitation on the shape of the honeycomb structure of the present embodiment, and the shape may be, for example, a cylindrical shape having a circular bottom face (circular cylindrical shape), a cylindrical shape having an oval bottom face, and a cylindrical shape having a polygonal (quadrangular, pentagonal, hexagonal, heptagonal, octagonal, etc.) bottom face. As the size of the honeycomb structure, the area of the bottom face is preferably 2000 to 20000 mm$^2$, more preferably 4000 to 10000 mm$^2$. In addition, the length of the honeycomb structure in the central axial direction is preferably 50 to 200 mm, 75 to 150 mm.

The honeycomb structure 100 of the present embodiment has an isostatic strength of preferably 1 MPa or more. When it is below 1 MPa, breakage may easily be caused upon using the honeycomb structure as a catalyst carrier or the like. The isostatic strength is measured by applying hydrostatic pressure in water.

Figure 4:
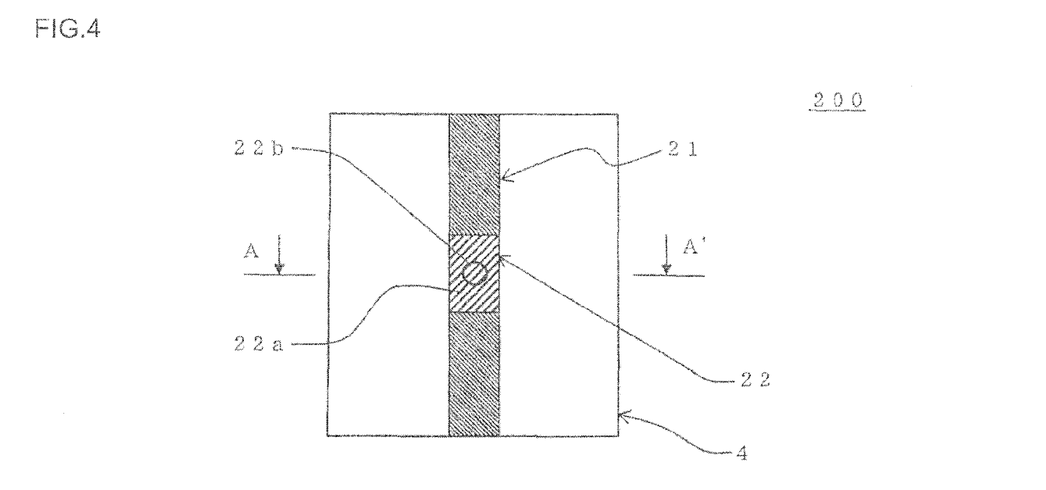
FIG. 4 is a side view schematically showing another embodiment of a honeycomb structure of the present invention.
Figure 5:
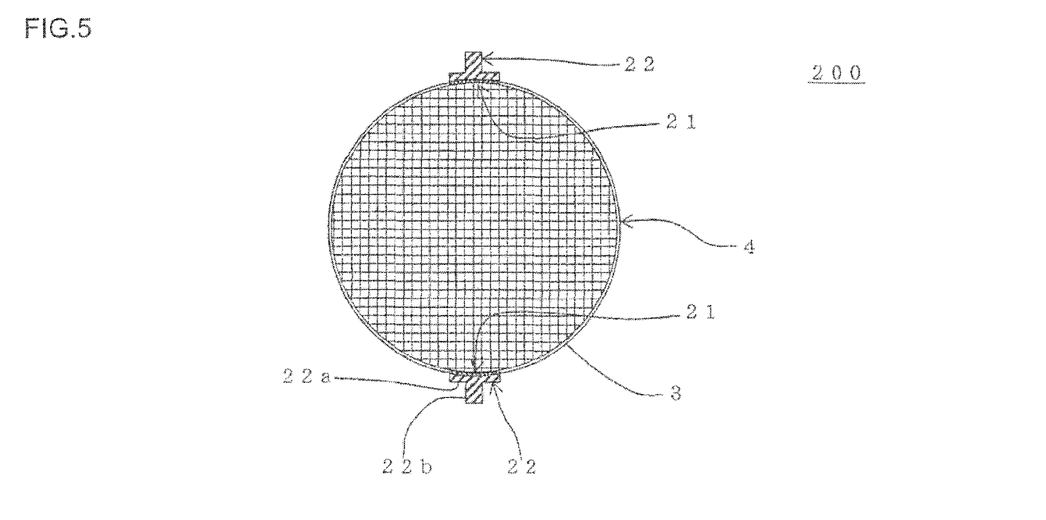
FIG. 5 is a schematic view showing the A-A' cross section of FIG. 4.

In still another embodiment of a honeycomb structure of the present invention, as shown in FIGS. 4 and 5, each of the electrode terminal protrusions 22, 22 for connecting an electric wire thereto is disposed on each of a pair of electrode portions 21, 21. The volume resistivity at 400° C. of the electrode terminal protrusions 22 is preferably not more than 20%, more preferably 1 to 10%, of the volume resistivity at 400° C. of the honeycomb structural portion 4. By thus disposing each of the electrode terminal protrusions 22 for connecting an electric wire thereto on each of a pair of electrode portions 21, 21, an electric wire from an external power source can be connected to the honeycomb structure 200 without breaking the honeycomb structural portion 4. When the volume resistivity at 400° C. of the electrode terminal protrusions 22 is larger than 20% of the volume resistivity at 400° C. of the honeycomb structural portion 4, electrification of the electrode terminal protrusions 22 becomes difficult, and heating of the honeycomb structural portion 4 may become difficult. FIG. 4 is a side view schematically showing another embodiment of a honeycomb structure. FIG. 5 is a schematic view showing the A-A' cross section of FIG. 4.

When the main components of the electrode portions 21 is silicon carbide particles and silicon, it is preferable that the main components of the electrode terminal protrusions 22 are also silicon carbide particles and silicon. Thus, by specifying the main components of the electrode terminal protrusions 22 to silicon carbide particles and silicon, the components of the electrode portions 21 and the components of the electrode terminal protrusions 22 become the same (or close), and thereby the electrode portions 21 and the electrode terminal protrusions 22 have the same (or close) thermal expansion coefficient. In addition, since the materials become the same (or close), the bonding strength between the electrode portions 21 and the electrode terminal protrusions 22 is enhanced. Therefore, even if thermal stress is applied to the honeycomb structure, peeling of the electrode portion 21 from the electrode terminal protrusion 22 and breakage of the bonded portion between the electrode portion 21 and the electrode terminal protrusion 22 can be inhibited. Here, "the electrode terminal protrusions 22 contain silicon carbide and silicon as the main components" means that the electrode terminal protrusions 22 contain silicon carbide and silicon at a rate of 90 mass % or more of the total.

There is no particular limitation on the shape of the electrode terminal protrusions 22, and any shape may be employed as long as they can be connected to the electrode portions 21 so that an electric wire can be connected thereto. For example, as shown in FIGS. 4 and 5, the electrode terminal protrusion 22 preferably has a shape where a circular columnar protrusion 22b is disposed on the a quadrangular plate-shaped base board 22a. By such a shape, the electrode terminal protrusions 22 can firmly be bonded to the electrode portions 21 by the base boards 22a, and the electric wires can securely be bonded thereto by the protrusions 22b.

In the electrode terminal protrusions 22, the thickness of the base boards 22a is preferably 1 to 5 mm. Such a thickness enables to securely bond the electrode terminal protrusions 22 to the electrode portions 21. When the thickness is smaller than 1 mm, the baseboards 22a become week, and thereby the baseboards 22a may easily be detached from the protrusion portions 22b. When the thickness is larger than 5 mm, the space for disposing the honeycomb structure may become larger than necessary.

In the electrode terminal protrusions 22, the length (width) in the "peripheral direction R of the honeycomb structural portion 4" of the base boards 22a is preferably 20 to 100%, more preferably 30 to 100%, of the length of the electrode portions 21 in the "peripheral direction R of the honeycomb structural portion 4". Such a range enables the electrode terminal protrusions 22 to be inhibited from peeling off from the electrode portion 21. When it is shorter than 20%, the electrode terminal protrusions 22 may easily be detached from the electrode portions 21. In the electrode terminal protrusions 22, the length of the base boards 22a in the "cell 2 extension direction" is preferably 5 to 30% of the length of the honeycomb structural portion 4 in the cell extension direction. Such a range of the length of the base boards 22 in the "cell 2 extension direction" enables to obtain sufficient bonding strength. When the length of the base boards 22a in the "cell 2 extension direction" is smaller than 5% of the length of the honeycomb structural portion 4 in the cell extension direction, the base boards 22a may easily be detached from the electrode portions 21. When it is larger than 30%, the mass may be increased.

In the electrode terminal protrusions 22, the thickness of the protrusion portions 22b is preferably 3 to 15 mm. Such thickness can securely bond the electric wire to the protrusion portion 22b. When it is smaller than 3 mm, the protrusion portions 22b may easily break. When it is larger than 15 mm, it may become difficult to connect an electric wire thereto. The length of the protrusion portions 22b is preferably 3 to 20 mm. Such a length enables an electric wire to bond securely to the protrusion portion 22b. When it is smaller than 3 mm, it may be difficult to connect the electric wire thereto. When it is longer than 20 mm, the protrusion portions 22b may easily break.

As shown in FIG. 4, the electrode terminal protrusions 22 is preferably disposed in the central portion of the electrode portion 21 in the "cell 2 extension direction". This enables to heat the entire honeycomb structural portion 4 uniformly.

The volume resistivity at 400° C. of the electrode terminal protrusions 22 is preferably 0.1 to 10 Ωcm, more preferably 0.5 to 5 Ωcm. Such a range of the volume resistivity at 400° C. of the electrode terminal protrusions 22 enables a current to be supplied efficiently to the electrode portions 21 form the electrode terminal protrusions 22 in the pipe where high temperature exhaust gas flows. When the volume resistivity at 400° C. of the electrode terminal protrusions 22 is lower than 0.1 Ωcm, deformation may be caused upon production. When the volume resistivity at 400° C. of the electrode terminal protrusions 22 is higher than 10 Ωcm, since the flow of a current becomes hard, supply of the current to the electrode portion 21 may become difficult.

The electrode terminal protrusions 22 have a porosity of preferably 25 to 45%, more preferably 30 to 40%. Such a range of the porosity of the electrode terminal protrusions 22 enables to obtain suitable volume resistivity. When the porosity of the electrode terminal protrusions 22 is lower than 25%, deformation may be caused upon production. When the porosity of the electrode terminal protrusions 22 is higher than 45%, strength of the electrode terminal protrusions 22 may fall. In particular, when the strength of the protrusion portions 22b is decreased, the protrusion portions 22b may easily break. The porosity is measured by a mercury porosimeter.

The electrode terminal protrusions 22 have an average pore size of preferably 5 to 30 μm, more preferably 15 to 25 μm. Such a range of the average pore size of the electrode terminal protrusions 22 enables to obtain suitable volume resistivity. When the average pore size of the electrode terminal protrusions 22 is smaller than 5 μm, deformation may be caused upon production. When the average pore size of the electrode terminal protrusions 22 is larger than 30 μm, the strength of the electrode terminal protrusions 22 may fall. In particular, when the strength of the protrusion portions 22b is decreased, the protrusion portions 22b may easily break. The average pore size is measured by a mercury porosimeter.

When the main components of the electrode terminal protrusions 22 are silicon carbide particles and silicon, the average particle diameter of the silicon carbide particles contained in the electrode terminal protrusions 22 is preferably 10 to 70 μm, more preferably 40 to 60 μm. Such a range of the average particle diameter of the silicon carbide particles contained in the electrode terminal protrusions 22 enables the volume resistivity at 400° C. of the electrode terminal protrusions 22 to be 0.1 to 10 Ωcm. When the average pore size of the silicon carbide particles contained in the electrode terminal protrusions 22 is smaller than 10 μm, the volume resistivity at 400° C. of the electrode terminal protrusions 22 may be too high. When the average pore size of the silicon carbide particles contained in the electrode terminal protrusions 22 is larger than 70 μm, the volume resistivity at 400° C. of the electrode terminal protrusions 22 may be too low. The average particle size of the silicon carbide particles contained in electrode terminal protrusions 22 is measured by a laser diffraction method.

The ratio of the mass of the silicon to the total mass of the silicon carbide particles and the silicon contained in the electrode terminal portions 22 is preferably 20 to 50 mass %, more preferably 20 to 40 mass %. Such a range of the ratio of mass of the silicon to the total mass of the silicon carbide particles and the silicon contained in the electrode terminal portions 22 enables to obtain suitable volume resistivity. When the ratio of the mass of the silicon to the total mass of the silicon carbide particles and the silicon contained in the electrode terminal portions 22 is lower than 20 mass %, the volume resistivity may become to high. When it is higher than 50 mass %, deformation may be caused upon production.

In a honeycomb structure 100 of the present embodiment, it is preferable that the electrode terminal protrusions 22 has a porosity of 25 to 45%, that the electrode terminal protrusions 22 has an average pores size of 5 to 30 µm, that the ratio of the "mass of the silicon" contained in the electrode terminal protrusions 22 to the "total mass of the silicon carbide particles and the silicon" contained in the electrode terminal portions 22 is preferably 20 to 50 mass %, that the average particle diameter of the silicon carbide particles contained in the electrode terminal protrusions 22 is 10 to 70 µm, and that the volume resistivity of the electrode terminal protrusions 22 is 0.1 to 10 Ωcm. These enable to electrify the honeycomb structure particularly uniformly.

In addition, the electrical resistance at 400° C. measured "between the electrode terminal protrusions disposed on each of the pair of electrode portions 21, 21" of the honeycomb structure 200 of the present embodiment is preferably 1 to 30Ω, more preferably 10 to 25Ω. When the electrical resistance at 400° C. is smaller than 1Ω, a current excessively flows when the honeycomb structure 100 is electrified by a power source of 200V, which is not preferable. When the electrical resistance at 400° C. larger than 30Ω, the flow of the current becomes difficult when the honeycomb structure 100 is electrified by a power source of 200V, which is not preferable. The electrical resistance at 400° C. of the honeycomb structure is measured by a two terminal method.

(2) Method for Manufacturing Honeycomb Structure:

Next, a method for manufacturing one embodiment of a honeycomb structure of the present invention will be described.

In the first place, to a silicon carbide powder (silicon carbide) are added metal silicon (metal silicon powder), a binder, a surfactant, a pore former, water, and the like to manufacture a forming raw material. It is preferable that the mass of the metal silicon is 10 to 30 mass % with respect to the total mass of the silicon carbide powder and the metal silicon. The average particle diameter of the silicon carbide particles in the silicon carbide powder is preferably 3 to 40 µm, more preferably 10 to 35 µm. The average particle size of the metal silicon (metal silicon powder) is preferably 2 to 20 µm. When it is smaller than 2 µm, the volume resistivity may become low. When it is larger than 20 µm, the volume resistivity may become too high. The average particle diameters of the silicon carbide particles and the metal silicon (metal silicon particles) are measured by a laser diffraction method. The silicon carbide particles are silicon carbide fine particles constituting the silicon carbide powder, and the metal silicon particles are metal silicon fine particles constituting the metal silicon powder. The total mass of the silicon carbide particles and metal silicon is preferably 30 to 78 mass % with respect to the mass of the entire forming raw material.

As the binder, there can be mentioned methyl cellulose, hydroxypropylmethyl cellulose, hydroxypropoxyl cellulose, hydroxyethyl cellulose, carboxymethyl cellulose, polyvinyl alcohol, and the like. Of these, it is preferable to use methyl cellulose and hydroxypropoxyl cellulose together. The binder content is preferably 2 to 10 mass % with respect to the entire forming row material.

The water content is preferably 20 to 60 mass % with respect to the entire forming raw material.

As the surfactant, ethylene glycol, dextrin, fatty acid soap, polyalcohol, or the like may be used. These may be used alone or in combination of two or more kinds. The surfactant content is preferably 2 mass % or low with respect to the entire forming raw material.

There is no particular limitation on the pore former as long as it forms pores after firing, and examples include graphite, starch, a resin balloon, a water-absorbing resin, and silica gel. The pore former content is preferably 10 mass % or less with respect to the entire forming raw material. The average particle diameter of the pore former is preferably 10 to 30 µm. When it is smaller than 10 µm, sufficient formation of the pores may be impossible. When it is larger than 30 µm, the die may be clogged upon forming. The average pore diameter of the pore former is measured by a laser diffraction method.

In addition, it is preferable that the forming raw material contains strontium carbonate as the sintering auxiliary. The content of the sintering auxiliary is preferably 0.1 to 3 mass % with respect to the entire forming raw material.

Next, the forming raw material is kneaded to form kneaded material. There is no particular limitation on the method for forming the kneaded material by kneading the forming raw material, and, for example, a method using a kneader, a vacuum kneader, or the like may be employed.

Next, the kneaded material is extruded to form a honeycomb formed body. Upon extrusion, it is preferable to use a die having a desired entire shape, cell shape, partition wall thickness, cell density, and the like. As the material for the die, superhard alloy which is hardly worn is preferable. The honeycomb formed body has a structure having porous partition walls separating and forming a plurality of cells functioning as fluid passages and the outer peripheral wall located in the outermost periphery.

The partition wall thickness, cell density, outer peripheral wall thickness, and the like of the honeycomb formed body can suitably be determined according to the structure of a honeycomb structure of the present invention to be manufactured in consideration of shrinkage due to drying and firing.

The honeycomb formed body obtained above is preferably dried. There is no particular limitation on the drying method, and examples of the method include an electromagnetic heating method such as microwave heat drying and high frequency dielectric heat drying and an external heating method such as hot air drying and superheated steam drying. Of these, it is preferable that, after drying a certain amount of moisture by an electromagnetic heating method, the other moisture is dried by an external heating method in that the entire formed body is dried quickly and uniformly lest a crack should be caused. As the conditions of drying, it is preferable that, after removing the moisture of 30 to 99 mass % with respect to the moisture before drying by an electromagnetic heating method, the moisture is made to be 3 mass % or less by an external heating method. Dielectric heat drying is preferable as the electromagnetic heating method, and hot air drying is preferable as the external heating method.

When the length of the honeycomb formed body in the central axial direction is not a desired length, it is preferable to cut both the end faces (both the end portions) to have a desired length. Though there is no particular limitation on the cutting method, a method using a rim saw cutter or the like can be employed.

Next, an electrode forming raw material for forming the electrode portions is prepared. When the main components of the electrode portions are silicon carbide and silicon, it is preferable to prepare the electrode forming raw material by adding predetermined additives to the silicon carbide powder and the silicon powder and kneading the mixture.

Specifically, to the silicon carbide powder (silicon carbide) are added metal silicon (metal silicon powder), a binder, a surfactant, a pore former, water, and the like, and they are kneaded to manufacture an electrode portion forming raw material. The mass of the metal silicon is preferably 20 to 40 mass % with respect to the total mass of the silicon carbide powder and the metal silicon. The average particle diameter of the silicon carbide particle of the silicon carbide powder is preferably 10 to 70 μl. The average particle size of the metal silicon (metal silicon powder) is preferably 2 to 20 μm. When it is smaller than 2 μm, the volume resistivity may become low. When it is larger than 20 μm, the volume resistivity may become too high. The average particle diameters of the silicon carbide particles and the metal silicon (metal silicon particles) are measured by a laser diffraction method. The silicon carbide particles are silicon carbide fine particles constituting the silicon carbide powder, and the metal silicon particles are metal silicon fine particles constituting the metal silicon powder. The total mass of the silicon carbide particles and metal silicon is preferably 40 to 80 mass % with respect to the mass of the entire electrode portion forming raw material.

As the binder, there can be mentioned methyl cellulose, hydroxypropylmethyl cellulose, hydroxypropoxyl cellulose, hydroxyethyl cellulose, carboxymethyl cellulose, polyvinyl alcohol, and the like. Of these, it is preferable to use methyl cellulose and hydroxypropoxyl cellulose together. The binder content is preferably 0.1 to 2 mass % with respect to the entire electrode portion forming row material.

The water content is preferably 19 to 55 mass % with respect to the entire electrode portion forming raw material.

As the surfactant, ethylene glycol, dextrin, fatty acid soap, polyalcohol, or the like may be used. These may be used alone or in combination of two or more kinds. The surfactant content is preferably 2 mass % or low with respect to the entire electrode portion forming raw material.

There is no particular limitation on the pore former as long as it forms pores after firing, and examples include graphite, starch, a resin balloon, a water-absorbing resin, and silica gel. The pore former content is preferably 10 mass % or less with respect to the entire electrode portion forming raw material. The average particle diameter of the pore former is preferably 10 to 30 μm. When it is smaller than 10 μm, sufficient formation of the pores may be impossible. When it is larger than 30 μm, the die may be clogged upon forming. The average pore diameter of the pore former is measured by a laser diffraction method.

In addition, it is preferable that the forming raw material contains strontium carbonate as the sintering aid. The content of the sintering aid is preferably 0.1 to 3 mass % with respect to the entire electrode portion forming raw material.

Next, it is preferable that a mixture obtained by mixing the silicon carbide powder (silicon carbide), the metal silicon (metal silicon powder), a binder, a surfactant, a pore former, water, and the like is kneaded to obtain a pasty electrode portion forming raw material. There is no particular limitation on the method for kneading, and, for example, a vertical mixer can be used.

Next, the electrode portion forming raw material obtained above is preferably applied on the side face of the dried honeycomb formed body. Though there is no particular limitation on the method for applying the electrode portion forming raw material on the side face of the honeycomb formed body, for example, a printing method can be employed. In addition, it is preferable that the electrode portion forming raw material is applied on the side face of the honeycomb formed body so as to have a shape of the electrode portion of the aforementioned honeycomb structure of the present invention. The thickness of the electrode portions can be made as desired by adjusting the thickness upon applying the electrode portion forming raw material. Since the electrode portions can be formed only by applying the electrode portion forming raw material on the side face of the honeycomb formed body, drying, and firing; the electrode portions can extremely easily be formed.

Next, it is preferable that the electrode portion forming raw material applied on the side face of the honeycomb formed body is dried. The drying condition is preferably 50 to 100° C.

Next, it is preferable to manufacture members for forming electrode terminal protrusions. The members for forming electrode terminal protrusions are bonded to the honeycomb formed body to form electrode terminal protrusions. Though there is no particular limitation on the shape of the members for forming the electrode terminal protrusions, it is preferable to have, for example, a shape shown in FIGS. 4 and 5. Then, it is preferable to bond the members for forming the electrode terminal protrusions obtained above to the portions where the electrode portion forming raw material is applied of the honeycomb formed body having the electrode portion forming raw material is applied thereon. Incidentally, there is no restriction on the order of manufacturing of the honeycomb formed body, preparation of the electrode portion forming raw material, and manufacturing of the members for forming electrode terminal protrusions.

It is preferable to obtain the members for forming electrode terminal protrusions by forming and drying the electrode terminal protrusion forming raw material (raw material for forming the members for forming electrode terminal protrusions). In the case of employing silicon carbide and silicon as the main components of the electrode terminal protrusions, the electrode terminal protrusion forming raw materials is preferably formed by adding predetermined additives to the silicon carbide powder and the silicon powder and kneading the mixture.

Specifically, to the silicon carbide powder (silicon carbide) are added metal silicon (metal silicon powder), a binder, a surfactant, a pore former, water, and the like, and they are kneaded to manufacture an electrode terminal protrusion forming raw material. The mass of the metal silicon is preferably 20 to 40 mass % with respect to the total mass of the silicon carbide powder and the metal silicon. The average particle diameter of the silicon carbide particle of the silicon carbide powder is preferably 10 to 70 μm. The average particle size of the metal silicon (metal silicon powder) is preferably 2 to 20 μm. When it is smaller than 2 μm, the volume resistivity may become low. When it is larger than 20 μm, the volume resistivity may become too high. The average particle diameters of the silicon carbide particles and the metal silicon (metal silicon particles) are measured by a laser diffraction method. The silicon carbide particles are silicon carbide fine particles constituting the silicon carbide powder, and the metal silicon particles are metal silicon fine particles constituting the metal silicon powder. The total mass of the silicon carbide particles and metal silicon is preferably 50 to 85 mass % with respect to the mass of the entire electrode terminal protrusion forming raw material.

As the binder, there can be mentioned methyl cellulose, hydroxypropylmethyl cellulose, hydroxypropoxyl cellulose, hydroxyethyl cellulose, carboxymethyl cellulose, polyvinyl alcohol, and the like. Of these, it is preferable to use methyl cellulose and hydroxypropoxyl cellulose together. The binder content is preferably 1 to 10 mass % with respect to the entire electrode terminal protrusion forming row material.

The water content is preferably 15 to 30 mass % with respect to the entire electrode terminal protrusion forming raw material.

As the surfactant, ethylene glycol, dextrin, fatty acid soap, polyalcohol, or the like may be used. These may be used alone or in combination of two or more kinds. The surfactant content is preferably 2 mass % or low with respect to the entire electrode terminal protrusion forming raw material.

There is no particular limitation on the pore former as long as it forms pores after firing, and examples include graphite, starch, a resin balloon, a water-absorbing resin, and silica gel. The pore former content is preferably 10 mass % or less with respect to the entire electrode terminal protrusion forming raw material. The average particle diameter of the pore former is preferably 10 to 30 μm. When it is smaller than 10 μm, sufficient formation of the pores may be impossible. When it is larger than 30 μm, the die may be clogged upon forming. The average particle diameter of the pore former is measured by a laser diffraction method.

Next, it is preferable that a mixture obtained by mixing the silicon carbide powder (silicon carbide), the metal silicon (metal silicon powder), a binder, a surfactant, a pore former, water, and the like is kneaded to obtain an electrode terminal protrusion forming raw material. There is no particular limitation on the method for kneading, and, for example, a kneader can be used.

There is no particular limitation on the method for forming the electrode terminal protrusion forming raw material obtained above into a shape of the members for forming electrode terminal protrusions, and a method of machining after extrusion can be mentioned.

It is preferable to obtain the members for forming electrode terminal protrusions by drying after forming the electrode terminal protrusion forming raw material into a shape of the members for forming electrode terminal protrusions. The drying condition is preferably 50 to 100° C.

Next, it is preferable to bond the members for forming the electrode terminal protrusions to the honeycomb formed body having the electrode portion forming raw material applied thereon. Though there is no particular limitation on the method for bonding the members for forming the electrode terminal protrusions to the honeycomb formed body (portions where the electrode portion forming raw material is applied), it is preferable to bond the members for forming the electrode terminal protrusions to the honeycomb formed body by the use of the aforementioned electrode portion forming raw material. For example, it is preferable to bond the members for forming the electrode terminal protrusions to the honeycomb formed body in such a manner that the electrode portion forming raw material is applied on the "face which is bonded to the honeycomb formed body (face to be brought into contact with the honeycomb formed body)" of each of the members for forming the electrode terminal protrusions and that the "face where the electrode portion forming raw material is applied" is brought into contact with the honeycomb formed body.

It is preferable that the honeycomb formed body having the electrode portion forming raw material applied thereon and the members for forming the electrode terminal protrusions bonded thereto is dried and fired to obtain a honeycomb structure of the present invention.

The drying conditions at this time is preferably 50 to 100° C.

In addition, it is preferable to perform calcination in order to remove the binder and the like before firing. The calcination is preferably performed at 400 to 500° C. for 0.5 to 20 hours in an ambient atmosphere. There is no particular limitation on the calcination and firing methods, and firing can be performed by the use of an electric furnace, a gas furnace, or the like. As preferable firing conditions, heating are performed at 1400 to 1500° C. for 1 to 20 hours in an inert atmosphere of nitrogen, argon, or the like. In addition, it is preferable to perform an oxygenation treatment at 1200 to 1350° C. for 1 to 10 hours after firing in order to improve durability.

Incidentally, the members for forming the electrode terminal protrusions may be bonded before firing the honeycomb formed body, or may be bonded after firing. In the case that the members for forming the electrode terminal protrusions are bonded after firing the honeycomb formed body, it is preferable to fire it again under the aforementioned conditions.

EXAMPLE

Hereinbelow, the present invention will be described more specifically by Examples. However, the present invention is by no means limited to these Examples.

Example 1

A silicon carbide (SiC) powder and a metal silicon (Si) powder were mixed at a mass ratio of 80:20, and to the mixture were added strontium carbonate as the sintering aid, hydroxypropylmethyl cellulose as the binder, a water-absorbing resin as the pore former, and water to obtain a forming raw material, which was kneaded by a vacuum kneader to obtain a circular columnar kneaded material. The binder content was 7 parts by mass with respect to 100 parts by mass of the total of the silicon carbide (SiC) powder and the metal silicon (Si) powder, the strontium carbonate content was 1 part by mass with respect to the total of the silicon carbide (SiC) powder and the metal silicon (Si) powder, the pore former content was 3 parts by mass with respect to 100 parts by mass of the total of the silicon carbide (SiC) powder and the metal silicon (Si) powder, and the water content was 42 parts by mass with respect to 100 parts by mass of the total of the silicon carbide (SiC) powder and the metal silicon (Si) powder. The silicon carbide powder had an average particle diameter of 20 μm, and the metal silicon powder had an average particle diameter of 6 μm. The pore former had an average particle diameter of 20 μm. The average particle diameters of the silicon carbide, metal silicon, and pore former were measured by a laser diffraction method.

The circular columnar kneaded material is formed by the use of an extruder to obtain a honeycomb formed body. After the honeycomb formed body obtained above was subjected to high frequency dielectric heat drying, it was dried at 120° C. for 2 hours by the use of a hot air drier, and both the end faces were cut off at a predetermined amount.

Next, the silicon carbide (SiC) powder and the metal silicon (Si) powder were mixed at a mass ratio of 65:35, and to the mixture were added strontium carbonate as the sintering aid, hydroxypropylmethyl cellulose as the binder, glycerin as the moisturizer, a surfactant as a dispersant, and water, and they were mixed. The mixture was kneaded to obtain an electrode portion forming raw material. The strontium carbonate content was 1 part by mass with respect to 100 parts by mass of the total of the silicon carbide (SiC) powder and the metal silicon (Si) powder, the binder content was 0.5 part by mass with respect to 100 parts by mass of the total of the silicon carbide (SiC) powder and the metal silicon (Si) powder, the glycerin content was 10 parts by mass with respect to 100 parts by mass of the total of the silicon carbide (SiC) powder and the metal silicon (Si) powder, the surfactant content was 0.3 part by mass with respect to 100 parts by mass of the total of the silicon carbide (SiC) powder and the metal silicon (Si) powder, and the water content was 42 parts by mass with respect to 100 parts by mass of the total of the silicon carbide (SiC) powder and the metal silicon (Si) powder. The silicon carbide powder had an average particle diameter of 52 μm, and the metal silicon powder had an average particle diameter of 6 μm. The average particle diameters of the silicon carbide and the metal silicon were measured by a laser diffraction method. The kneading was performed by the use of a vertical stirrer.

Next, the electrode portion forming raw material was applied on the side face of the dried honeycomb formed body extensively between both the end faces of the honeycomb formed body into a band shape to have a thickness of 0.5 mm and a width of 15 mm. The electrode portion forming raw material was applied to two positions on the side face of the dried honeycomb formed body. In a cross section perpendicular to the cell extension direction, one of the two positions where the electrode portion forming raw material was applied was disposed across the central portion of the honeycomb formed body from the other position where the electrode portion forming raw material was applied.

Next, the electrode portion forming raw material applied on the honeycomb formed body was dried. The drying condition was 70° C.

Next, the silicon carbide (SiC) powder and the metal silicon (Si) powder were mixed at a mass ratio of 65:35, and to the mixture were added hydroxypropylmethyl cellulose as the binder and water, and they were mixed. The mixture was kneaded to obtain an electrode terminal protrusion forming raw material. The electrode terminal protrusion forming raw material was kneaded by a vacuum kneader to obtain kneaded material. The binder content was 4 parts by mass with respect to 100 parts by mass of the total of the silicon carbide (SiC) powder and the metal silicon (Si) powder, and the water content was 22 parts by mass with respect to 100 parts by mass of the total of the silicon carbide (SiC) powder and the metal silicon (Si) powder. The silicon carbide powder had an average particle diameter of 52 μm, and the metal silicon powder had an average particle diameter of 6 μm. The average particle diameters of the silicon carbide and the metal silicon were measured by a laser diffraction method.

The kneaded material obtained above was formed by the use of a vacuum kneader into a shape of the electrode terminal protrusions 22 shown in FIGS. 4 and 5 and then dried to obtain members for forming the electrode terminal protrusions. In addition, the drying condition was 70° C. The portion corresponding to the plate-shaped base board 22a had a size of 3 mm×12 mm×15 mm. Each of the portions corresponding to the protrusion portions 22b had a circular columnar shape where the diameter of the bottom face was 7 mm and where the length in the central axial direction was 10 mm. Two members for forming the electrode terminal protrusions were manufactured.

Next, each of the two members for forming the electrode terminal protrusions was bonded to each of the two portions where the electrode portion forming raw material was applied of the honeycomb formed body. The members for forming the electrode terminal protrusions were bonded to the portions where the electrode portion forming raw material was applied of the honeycomb formed body by the use of the electrode portion forming raw material. Then, the honeycomb formed body where the electrode portion forming raw material was applied and where the members for forming the electrode terminal protrusions were bonded was degreased and fired, and further subjected to an oxidation treatment to obtain a honeycomb structure. The degreasing conditions were 550° C. and 3 hours. The firing conditions were 1450° C., 2 hours, and argon atmosphere. The conditions for the oxidation treatment were 1300° C. and 1 hour. The honeycomb structure obtained above was a combination of the honeycomb structural portion A1 shown in Table 1, the electrode portion B3 shown in Table 2, and the electrode terminal protrusion C3 shown in Table 3. Table 1 shows characteristics of the honeycomb structural portion, Table 2 shows characteristics of the electrode portions, and Table 3 shows characteristics of the electrode terminal protrusions.

The partition walls of the honeycomb structure obtained above had an average pore size (pore diameter) of 8.6 μm and a porosity of 45%. The average pore size and the porosity were measured by a mercury porosimeter. In addition, the honeycomb structure had a partition wall thickness of 90 μm and a cell density of 90 cells/cm$^2$. In addition, the honeycomb structure had a circular bottom face having a diameter of 93 mm and a length of 100 mm in the cell extension direction. The honeycomb structure obtained above had an isostatic strength of 2.5 MPa. The isostatic strength is fracture strength measured by applying hydrostatic pressure in water.

Regarding the honeycomb structural portion, the electrode portions, and the electrode terminal protrusions of the honeycomb structure obtained above, the "volume resistivity at 400° C. (volume resistivity)" was obtained by the following method. The results are shown in Tables 1 to 3. In addition, regarding the honeycomb structure obtained above, "electrode portion/honeycomb structural portion volume resistivity ratio (%)", "electrode terminal portion/honeycomb structural portion volume resistivity ratio (%)" "electrical resistance at 400° C. (electrical resistance of a honeycomb structure) (Ω)", "current value stability", and "pressure loss" were obtained by the following methods. The results are shown in Table 5. In Table 5, "A" of the column of "current value stability" means that 30 to 100 A or a current stably flowed. "B" means that there was a case that the current was "20 A or more and below 30 A" or "above 100 A and 700 A or less". In addition, "C" means that there was a case that the current was "below 20 A" or "above 700 A" and very unstable. A and B mean "passed", and C means "failed". In Table 1, "A" of the column of "pressure loss" means an aperture ratio of 80% or more. In addition, "B" means an aperture ratio of below 80%.

Incidentally, in Tables 1 to 3, the "SiC compounding amount (mass %)" shows the compounding ratio (mass ratio) of silicon carbide with respect to the total mass of silicon carbide and metal silicon, and "Si compounding amount (mass %)" shows the compounding ratio (mass ratio) of metal silicon with respect to the total mass of silicon carbide and metal silicon. In addition, the "pore former compounding amount (pore former) (part by mass)" shows part (s) by mass of the pore former with respect to 100 parts by mass of the entire forming raw material, and the "water ratio (water) (part by mass)" shows part (s) by mass of the water with respect to 100 parts by mass of the entire forming raw material. In addition, the "cell shape" shows the shape of the cells in a cross section perpendicular to the cell extension direction. The "rib thickness (μm)" shows thickness of partition walls. The "number of cells (cells/cm$^2$)" shows the cell density in a cross section perpendicular to the cell extension direction. In addition, the porosity and pore size in Table 1 show porosity and average pore size of the partition walls of the honeycomb structural portion, respectively. The porosity and the pore size in Table 2 show porosity and average pore size of the electrode portions. The porosity and pore size in Table 3 show porosity and average pore size of the electrode terminal protrusions. In Table 5, the column of "electrode portion/honeycomb structural portion volume resistivity ratio (%)" shows the value obtained by dividing the volume resistivity value of the electrode portions by the volume resistivity value of the honeycomb structural portion. In addition, Table 5, the column of "electrode terminal portion/honeycomb structural portion volume resistivity ratio (%)" shows the value obtained by dividing the volume resistivity value of the electrode terminal protrusions by the volume resistivity value of the honeycomb structural portion.

(Volume Resistivity)

The test piece having a size of 10 mm×10 mm×50 mm was manufactured by the same material as the object to be measured (that is, each of the test pieces was manufactured by the same material as the material for the honeycomb structural portion in the case of measuring the volume resistivity of the honeycomb structural portion, the material for the electrode portion in the case of measuring the volume resistivity of the electrode portion, and the material for the electrode terminal protrusions in the case of measuring the volume resistivity of the electrode terminal protrusions). A silver paste was applied on the entire faces of both the end portions of the test pieces, and wire was connected to be able to electrify the test pieces. A voltage-applying current gauge was connected to each test piece, and a voltage was applied. A thermocouple was arranged in the central portion of the test piece, and the temperature change with the passage of time of the test piece upon applying a voltage was confirmed by a recorder. By application of 100 to 200V, the volume resistivity was calculated from the current value at the time that the test piece temperature reached 400° C., voltage value, and test piece size.

(Electrical Resistance)

A thermocouple was arranged in the central portion of the honeycomb structure, and the temperature in the central portion of the honeycomb structure was recorded by a recorder. Then, a voltage-applying current gauge was connected to each of two electrode terminal protrusions of the honeycomb structure, and a voltage of 200V was applied. Then, the current value of the voltage-applying current gauge at the time that the temperature of the central portion of the honeycomb structure reached 400° C. was read. The electrical resistance of the honeycomb structure was obtained by the voltage (200V) and the current value.

(Current Value Stability)

In the same manner as in the aforementioned "electrical resistance" test, 600V was applied, and the current value was measured at the time that the average temperature of the honeycomb structure reached 400° C.

(Pressure Loss)

Pressure loss of the honeycomb structure was evaluated from the aperture ratio of a cross section of the honeycomb structure. The aperture ratio was defined as the ratio of the "total area of the cells (aperture portions)" in a cross section perpendicular to the "cell extension direction" of the honeycomb structure to a cross sectional area (area of a cross section perpendicular to the cell extension direction) of a honeycomb structure.

TABLE 1

| Honeycomb structural portion | SiC average particle diameter (μm) | SiC compounding amount (mass %) | Si average particle diameter (μm) | Si compounding amount (mass %) | Pore former average particle diameter (μm) | Pore former compounding amount (parts by mass) |
|---|---|---|---|---|---|---|
| A1 | 20 | 80 | 6 | 20 | 20 | 3 |
| A2 | 15 | 80 | 6 | 20 | 20 | 3 |
| A3 | 10 | 80 | 6 | 20 | 20 | 3 |
| A4 | 8 | 80 | 6 | 20 | 20 | 3 |
| A5 | 5 | 80 | 6 | 20 | 20 | 3 |
| A6 | 3 | 80 | 6 | 20 | 20 | 3 |
| A7 | 10 | 90 | 6 | 10 | 20 | 3 |
| A8 | 10 | 70 | 6 | 30 | 20 | 3 |
| A9 | 10 | 60 | 6 | 40 | 20 | 3 |
| A10 | 20 | 60 | 20 | 40 | 20 | 0 |
| A11 | 10 | 80 | 6 | 20 | 20 | 1 |
| A12 | 10 | 80 | 6 | 20 | 20 | 5 |
| A13 | 10 | 80 | 12 | 20 | 20 | 3 |
| A14 | 20 | 80 | 20 | 20 | 20 | 3 |
| A15 | 5 | 80 | 2 | 20 | 10 | 3 |
| A16 | 30 | 80 | 20 | 20 | 30 | 3 |
| A17 | 10 | 30 | 6 | 20 | 20 | 3 |
| A18 | 8 | 80 | 6 | 20 | 20 | 3 |
| A19 | 20 | 70 | 6 | 30 | 20 | 2 |
| A20 | 20 | 70 | 6 | 30 | 20 | 2 |
| A21 | 40 | 80 | 6 | 20 | 20 | 3 |
| A22 | 20 | 70 | 6 | 30 | 20 | 0 |
| A23 | 52 | 80 | 6 | 20 | 30 | 3 |
| A24 | 1 | 80 | 6 | 20 | 30 | 3 |

| Honeycomb structural portion | Water content (parts by mass) | Porosity (%) | Pore size (μm) | Rib thickness (μm) | Number of cells (cells/cm²) | Cell shape | Volume resistivity (Ωcm) |
|---|---|---|---|---|---|---|---|
| A1 | 42 | 45 | 8.6 | 90 | 90 | Quadrangular | 3.6 |
| A2 | 42 | 47 | 7.4 | 90 | 90 | Quadrangular | 7.4 |
| A3 | 42 | 48 | 6.3 | 90 | 90 | Quadrangular | 10.2 |
| A4 | 42 | 49 | 5.2 | 90 | 90 | Quadrangular | 16.6 |
| A5 | 42 | 50 | 3.9 | 90 | 90 | Quadrangular | 2.5 |
| A6 | 42 | 50 | 2.3 | 90 | 90 | Quadrangular | 38.4 |
| A7 | 42 | 52 | 5.5 | 90 | 90 | Quadrangular | 14 |
| A8 | 42 | 45 | 7.2 | 90 | 90 | Quadrangular | 4.6 |
| A9 | 42 | 42 | 8.4 | 90 | 90 | Quadrangular | 2.8 |
| A10 | 22 | 35 | 9.6 | 90 | 90 | Quadrangular | 2.4 |
| A11 | 30 | 40 | 5.7 | 90 | 90 | Quadrangular | 9.2 |

TABLE 1-continued

|  |  |  |  |  |  |  |  |
|---|---|---|---|---|---|---|---|
| A12 | 54 | 60 | 8.7 | 90 | 90 | Quadrangular | 22.2 |
| A13 | 42 | 46 | 7.6 | 90 | 90 | Quadrangular | 9.4 |
| A14 | 42 | 42 | 10 | 90 | 90 | Quadrangular | 3 |
| A15 | 42 | 53 | 3.5 | 50 | 140 | Quadrangular | 31.2 |
| A16 | 42 | 42 | 14 | 150 | 60 | Quadrangular | 2.6 |
| A17 | 42 | 48 | 5.9 | 90 | 90 | Hexagonal | 10.2 |
| A18 | 42 | 49 | 5.2 | 60 | 115 | Hexagonal | 16.6 |
| A19 | 36 | 37 | 9.2 | 130 | 90 | Quadrangular | 2.3 |
| A20 | 36 | 37 | 9.2 | 200 | 90 | Quadrangular | 2.3 |
| A21 | 42 | 38 | 19.8 | 130 | 90 | Quadrangular | 2.1 |
| A22 | 22 | 30 | 12.6 | 90 | 90 | Quadrangular | 1.3 |
| A23 | 42 | 40 | 12.3 | 90 | 90 | Quadrangular | 0.8 |
| A24 | 42 | 56 | 1.5 | 90 | 90 | Quadrangular | 76 |

TABLE 2

|  | SiC average particle diameter (μm) | SiC compounding amount (mass %) | Si average particle diameter (μm) | Si compounding amount (mass %) | Porosity (%) | Pore size (μm) | Volume resistivity (Ωcm) |
|---|---|---|---|---|---|---|---|
| Electrode portion B1 | 30 | 70 | 6 | 30 | 38 | 15.0 | 1.6 |
| Electrode portion B2 | 52 | 70 | 6 | 30 | 35 | 17.0 | 1.9 |
| Electrode portion B3 | 52 | 65 | 6 | 35 | 35 | 17.0 | 0.8 |
| Electrode portion B4 | 52 | 60 | 6 | 40 | 33 | 18.0 | 0.4 |
| Electrode portion B5 | 52 | 50 | 6 | 50 | 31 | 18.5 | 0.2 |
| Electrode portion B6 | 20 | 80 | 6 | 20 | 43 | 13.0 | 4.1 |
| Electrode portion B7 | 70 | 80 | 6 | 20 | 35 | 29.5 | 0.3 |
| Electrode portion B8 | 70 | 50 | 6 | 50 | 30 | 45.0 | 0.1 |
| Electrode portion B9 | 10 | 80 | 6 | 20 | 60 | 5.0 | 10 |
| Electrode portion B10 | 5 | 85 | 6 | 15 | 49 | 3.1 | 32.2 |

TABLE 3

|  | SiC average particle diameter (μm) | SiC compounding amount (mass %) | Si average particle diameter (μm) | Si compounding amount (mass %) | Porosity (%) | Pore size (μm) | Volume resistivity (Ωcm) |
|---|---|---|---|---|---|---|---|
| Electrode terminal protrusion C1 | 30 | 70 | 6 | 30 | 38 | 15.0 | 1.6 |
| Electrode terminal protrusion C2 | 52 | 70 | 6 | 30 | 35 | 17.0 | 1.2 |
| Electrode terminal protrusion C3 | 52 | 65 | 6 | 35 | 35 | 17.0 | 0.8 |
| Electrode terminal protrusion C4 | 52 | 60 | 6 | 40 | 31 | 18.0 | 0.4 |
| Electrode terminal protrusion C5 | 70 | 50 | 6 | 50 | 25 | 30.0 | 0.1 |
| Electrode terminal protrusion C6 | 20 | 80 | 6 | 20 | 43 | 13.0 | 4.1 |
| Electrode terminal protrusion C7 | 10 | 80 | 5 | 20 | 45 | 5.0 | 10 |
| Electrode terminal protrusion C8 | 5 | 85 | 6 | 15 | 49 | 3.1 | 32.2 |

TABLE 4

|  | Honeycomb structural portion | Electrode portion | Electrode terminal protrusion |
|---|---|---|---|
| Example 1 | Honeycomb structural portion A1 | Electrode portion B3 | Electrode terminal protrusion C3 |
| Example 2 | Honeycomb structural portion A2 | Electrode portion B3 | Electrode terminal protrusion C3 |
| Example 3 | Honeycomb structural portion A3 | Electrode portion B6 | Electrode terminal protrusion C6 |
| Example 4 | Honeycomb structural portion A4 | Electrode portion B1 | Electrode terminal protrusion C6 |
| Example 5 | Honeycomb structural portion A5 | Electrode portion B9 | Electrode terminal protrusion C7 |
| Example 6 | Honeycomb structural portion A6 | Electrode portion B9 | Electrode terminal protrusion C7 |
| Example 7 | Honeycomb structural portion A7 | Electrode portion B8 | Electrode terminal protrusion C6 |

TABLE 4-continued

|  | Honeycomb structural portion | Electrode portion | Electrode terminal protrusion |
|---|---|---|---|
| Example 8 | Honeycomb structural portion A8 | Electrode portion B2 | Electrode terminal protrusion C1 |
| Example 9 | Honeycomb structural portion A9 | Electrode portion B5 | Electrode terminal protrusion C4 |
| Example 10 | Honeycomb structural portion A10 | Electrode portion B5 | Electrode terminal protrusion C5 |
| Example 11 | Honeycomb structural portion A11 | Electrode portion B4 | Electrode terminal protrusion C2 |
| Example 12 | Honeycomb structural portion A12 | Electrode portion B4 | Electrode terminal protrusion C6 |
| Example 13 | Honeycomb structural portion A13 | Electrode portion B7 | Electrode terminal protrusion C1 |
| Example 14 | Honeycomb structural portion A14 | Electrode portion B1 | Electrode terminal protrusion C3 |
| Example 15 | Honeycomb structural portion A15 | Electrode portion B1 | Electrode terminal protrusion C3 |
| Example 16 | Honeycomb structural portion A16 | Electrode portion B2 | Electrode terminal protrusion C4 |
| Example 17 | Honeycomb structural portion A17 | Electrode portion B2 | Electrode terminal protrusion C4 |
| Example 18 | Honeycomb structural portion A18 | Electrode portion B2 | Electrode terminal protrusion C4 |
| Example 19 | Honeycomb structural portion A19 | Electrode portion B2 | Electrode terminal protrusion C4 |
| Example 20 | Honeycomb structural portion A20 | Electrode portion B2 | Electrode terminal protrusion C4 |
| Example 21 | Honeycomb structural portion A21 | Electrode portion B4 | Electrode terminal protrusion C5 |
| Example 22 | Honeycomb structural portion A22 | Electrode portion B4 | Electrode terminal protrusion C5 |
| Comp. Ex. 1 | Honeycomb structural portion A23 | Electrode portion B3 | Electrode terminal protrusion C3 |
| Comp. Ex. 2 | Honeycomb structural portion A24 | Electrode portion B9 | Electrode terminal protrusion C6 |

TABLE 5

|  | Electrode portion/ honeycomb structural portion volume resistivity ratio (%) | Electrode terminal portion/ honeycomb structural portion volume resistivity ratio (%) | Electrical resistance of honeycomb structure ($\Omega$) | Current value stability | Pressure loss |
|---|---|---|---|---|---|
| Example 1 | 22 | 22 | 2.2 | B | A |
| Example 2 | 11 | 11 | 4.7 | B | A |
| Example 3 | 40 | 40 | 8.6 | A | A |
| Example 4 | 10 | 25 | 8.6 | A | A |
| Example 5 | 40 | 40 | 21.0 | B | A |
| Example 6 | 26 | 26 | 30.0 | B | A |
| Example 7 | 1 | 29 | 6.7 | A | A |
| Example 8 | 26 | 35 | 3.1 | B | A |
| Example 9 | 7 | 14 | 1.4 | B | A |
| Example 10 | 8 | 4 | 1.3 | B | A |
| Example 11 | 4 | 13 | 5.1 | B | A |
| Example 12 | 2 | 18 | 10.8 | A | A |
| Example 13 | 3 | 17 | 5.3 | B | A |
| Example 14 | 40 | 27 | 2.3 | B | A |
| Example 15 | 4 | 3 | 14.8 | A | A |
| Example 16 | 31 | 15 | 1.4 | B | B |
| Example 17 | 8 | 4 | 6.7 | A | A |
| Example 18 | 5 | 2 | 9.5 | A | A |
| Example 19 | 35 | 17 | 1.8 | B | B |
| Example 20 | 35 | 17 | 1.3 | B | B |
| Example 21 | 19 | 5 | 1.1 | B | B |
| Example 22 | 31 | 8 | 1.2 | B | A |
| Comp. Ex. 1 | 100 | 100 | 0.8 | C | A |
| Comp. Ex. 2 | 42 | 42 | 45.0 | C | A |

Examples 2 to 22

Comparative Examples 1, 2

Each of the honeycomb structures was manufactured in the same manner as in Example 1 except that the honeycomb structural portion, electrode portions, and electrode terminal protrusions were changed as shown in Table 4. The column of "honeycomb structural portion" in Table 4 means that the honeycomb structural portions of the same reference numerals in Table 1 were used. The column of electrode portion in Table 4 means that the electrode portions of the same reference numerals in Table 2 were used. In addition, the column of electrode terminal protrusion in Table 4 means that the electrode terminal protrusions of the same reference numerals in Table 3 were used. In the same manner as in Example 1, regarding the honeycomb structural portion, electrode portions, and electrode terminal protrusions of each of the honeycomb structures, "volume resistivity at 400° C. (volume resistivity)" was obtained by the aforementioned method. The results are shown in Tables 1 to 3. In addition, regarding the honeycomb structures, "electrode portion/honeycomb structural portion volume resistivity ratio (%)", "electrode terminal portion/honeycomb structural portion volume resistivity ratio (%)", "electrical resistance at 400° C. (electrical resistance of a honeycomb structure) ($\Omega$)", "current value stability", and "pressure loss" were obtained by the aforementioned methods. The results are shown in Table 5.

From Table 1, it can be understood that, when the silicon carbide has an average particle diameter of 3 to 30 µm, the volume resistivity of the honeycomb structural portion can be made 1 to 40 $\Omega$cm. In addition, when the silicon carbide has an average particle diameter of 3 to 30 µm, there electrical resistance of the honeycomb structure can be made 1 to 40$\Omega$. It can also be understood that, when the average particle diameter of the silicon carbide is smaller than 3 µm, the volume resistivity of the honeycomb structure becomes too high. When the average particle diameter of the silicon carbide is larger than 30 µm, the volume resistivity of the honeycomb structure becomes too low.

INDUSTRIAL APPLICABILITY

A honeycomb structure of the present invention can suitably be used as a carrier for a catalytic device for purifying exhaust gas discharged from an internal combustion engine in various fields of chemistry, electric power, iron and steel, and the like.

DESCRIPTION OF REFERENCE NUMERALS

1: partition wall, 2: cell, 3: outer peripheral wall, 4: honeycomb structural portion, 5: side face, 11: one end face, 12: the other end face, 21: electrode portion, 21a, 21b: end portion of electrode portion, 22: electrode terminal protrusion, 22a: base board, 22b: protrusion, 100, 200, 300: honeycomb structure, O: central portion, R: peripheral direction

The invention claimed is:

1. A honeycomb structure comprising:
a cylindrical honeycomb structural portion having porous partition walls functioning as fluid passages and separating and forming a plurality of cells extending from one end face to the other end face and an outer peripheral wall located at the outermost periphery, and a pair of electrode portions disposed on the side face of the honeycomb structural portion;
wherein the partition walls and the outer peripheral wall contain silicon carbide particles as a framework and silicon as a binder for binding the silicon carbide particles;
wherein the honeycomb structure has a partition wall thickness of 50 to 200 µm, a cell density of 40 to 150 cells/cm$^2$, and an average particle diameter of the silicon carbide particles as a framework of 3 to 40 µm; and
wherein the honeycomb structural portion has a volume resistivity of 1 to 40 Ωcm at 400° C., and the volume resistivity of the electrode portion at 400° C. is not more than 40% of the volume resistivity of the honeycomb structural portion at 400° C.

2. The honeycomb structure according to claim 1, wherein each of the pair of electrode portions is formed into a band shape extending in a cell extension direction of the honeycomb structural portion; and
wherein in a cross section perpendicular to the cell extension direction, one of the pair of electrode portions is disposed across a central portion of the honeycomb structural portion from the other electrode portion.

3. The honeycomb structure according to claim 1, wherein the length of the electrode portion in the cell extension direction is not more than 90% of the length of the honeycomb structure in the cell extension direction.

4. The honeycomb structure according to claim 1, wherein the length of the electrode portions in the peripheral direction of the honeycomb structural portion is 1/30 to 1/3 of the length of the side face of the honeycomb structural portion in the peripheral direction.

5. The honeycomb structure according to claim 1, wherein the electrode portions have a thickness of 0.2 to 6.0 mm.

6. The honeycomb structure according to claim 1, wherein an electrode terminal protrusion for connecting an electric wire thereto is disposed on each of the pair of electrode portions, and the volume resistivity of the electrode terminal protrusion at 400° C. is not more than 40% of the volume resistivity of the honeycomb structural portion at 400° C.

7. The honeycomb structure according to claim 6, wherein the electrical resistance measured at 400° C. between the electrode terminal protrusions disposed on each of the pair of electrode portions is 1 to 30Ω.

8. The honeycomb structure according to claim 1, wherein the electrode portions contain silicon carbide particles and silicon as the main components.

9. The honeycomb structure according to claim 8, wherein the electrode portions have a porosity of 30 to 60% and an average pore size of 5 to 45 µm;
wherein the ratio of mass of the silicon to total mass of the silicon carbide particles and the silicon contained in the electrode portions is 20 to 50 mass %;
wherein the average particle diameter of the silicon carbide particles contained in the electrode portions is 10 to 70 µm; and
wherein the volume resistivity of the electrode portions at 400° C. is 0.1 to 10 Ωcm.

10. The honeycomb structure according to claim 6, wherein the electrode terminal protrusions contain silicon carbide particles and silicon as the main components.

11. The honeycomb structure according to claim 10, wherein the electrode terminal protrusions have a porosity of 25 to 45% and an average pore size of 5 to 30 µm;
wherein the ratio of mass of the silicon to the total mass of the silicon carbide particles and the silicon contained in the electrode terminal protrusions is 20 to 50 mass %;
wherein the average particle diameter of the silicon carbide particles contained in the electrode terminal protrusions is 10 to 70 µm; and
wherein the volume resistivity of the electrode terminal protrusions at 400° C. is 0.1 to 10 Ωcm.

12. The honeycomb structure according to claim 1, wherein the honeycomb structure has a partition walls thickness of 70 to 130 µm and a cell density of 70 to 100 cells/cm$^2$, and the silicon carbide particles as the framework have an average particle diameter of 10 to 35 µm, the partition walls have a porosity of 35 to 45% and an average pore size of 10 to 20 µm;
wherein the ratio of mass of the silicon as the binder to the total mass of the silicon carbide particles as the framework and the silicon as the binder contained in the honeycomb structural portions is 25 to 35 mass %; and
wherein the volume resistivity of the honeycomb structural portion at 400° C. is 10 to 35 Ωcm.

13. The honeycomb structure according to claim 1, wherein the cell shape in a cross section perpendicular to the cell extension direction is quadrangular or hexagonal.

14. The honeycomb structure according to claim 1, wherein, in a cross section perpendicular to the cell extension direction, when a tangent line in contact with the outer periphery of the honeycomb structural portion is drawn in the central portion of the honeycomb structural portion in the peripheral direction, the tangent line is parallel to a partition wall.

* * * * *